June 6, 1961 H. G. BORSHEIM ET AL 2,986,956

DRIVE ASSEMBLY

Filed Oct. 14, 1959 2 Sheets-Sheet 1

*INVENTORS*
H. G. BORSHEIM
R. L. CADE

INVENTORS
H. G. BORSHEIM
R. L. CADE

United States Patent Office 2,986,956
Patented June 6, 1961

2,986,956
DRIVE ASSEMBLY
Harold G. Borsheim, Waterloo, and Richard L. Cade, Cedar Falls, Iowa, assignors to Deere & Company, Moline, Ill., a corporation of Delaware
Filed Oct. 14, 1959, Ser. No. 846,458
14 Claims. (Cl. 74—606)

This invention relates to a drive assembly and more particularly to such assembly as applied to a tractor or similar vehicle. Still more particularly, the invention relates to the arrangement of drive components in a housing or the like in such manner that ready assembly and disassembly may be accomplished.

In a crawler tractor in particular, in which steering clutches and brakes are employed in the final drive, the problem of assembly and disassembly has long received the attention of designers. It is commonplace in most assemblies to provide an arrangemnet in which the steering clutch and brake assemblies can be bodily removed from their respective compartments without too much disassembly of related components. The present invention aims to improve a drive assembly along these lines; that is, it has for its principal object the provision of a design in which drive units, such as steering clutches and brakes, can be removed without necessitating the removal of a large number of other parts. For this purpose, the invention features a design in which the housing is compartmented to provide separate compartments for the steering clutches and brakes, one at each side of a final drive bevel gear. The invention features the provision for axial removal of a pair of end-to-end shafts through an outer wall of one of the compartments, the structure being symmetrical at both sides of the vehicle. It is another feature of the invention to provide a rotatable external part, such as a final drive sprocket, which has a removable section via which access may be had to a cap which may be removed for exposing the first shaft to be removed axially through the opening uncovered by removal of the cap. A further and significant feature of the invention is improved means for connecting the two end-to-end shafts to their respective parts of the associated clutch. Subsidiary features in this respect relate to improved means for mounting one shaft at one end on the associated end of the other shaft. An important feature of the invention resides in improved means, accessible when one shaft is removed, for releasing the other shaft from its associated clutch component.

The foregoing and other important objects and desirable features inherent in and encompassed by the invention will become apparent as a preferred embodiment thereof is disclosed, by way of example, in the accompanying description and appended drawings, the figures of which are described below.

Figure 1:
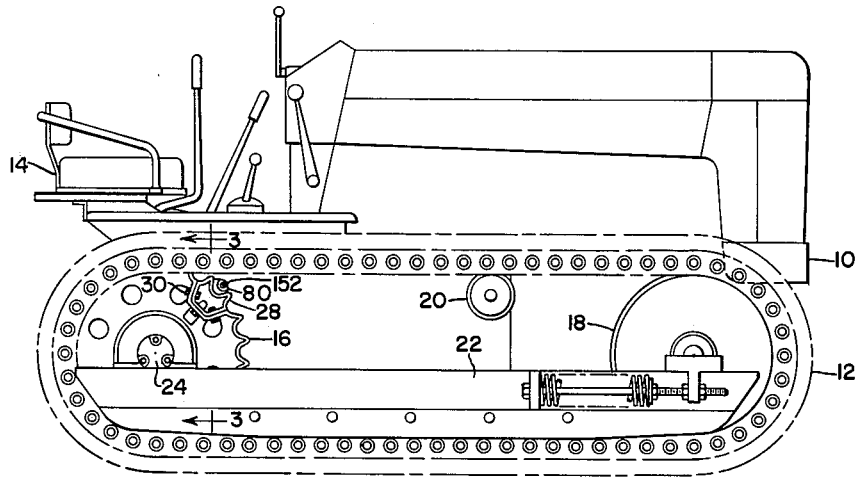
FIG. 1 is a side elevation, partly schematic, of a typical crawler tractor in which the invention finds particular utility.

The environmental vehicle chosen for purposes of illustration may be regarded as a typical crawler tractor having a longitudinal main body 10 carried at opposite sides on endless tracks 12, only one of which appears in the drawing. The body carries at its rear end a typical operator's seat 14 in proximity to which are located conventional controls, which need not be described. Each endless track is carried at its rear end by a drive sprocket 16 and at its front end by a front idler 18. The front idler and associated track rollers, as at 20, are carried by a track frame 22 which is pivotally connected at its rear end 24, by any suitable means not material here, to a transverse dead axle 26 rigidly mounted in a rear housing portion or means 28 forming part of or rigidly secured to the main body 10.

Figure 2:
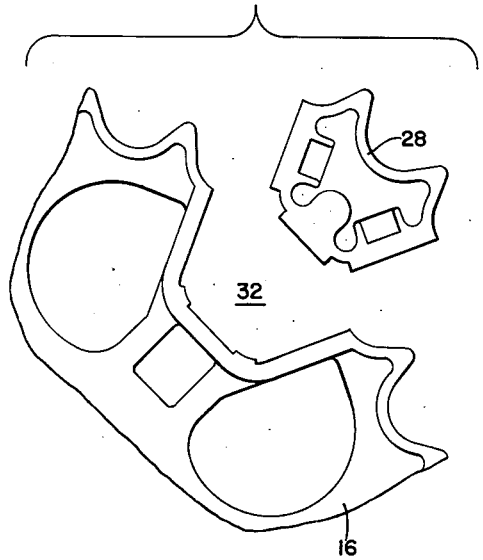
FIG. 2 is an enlarged fragmentary exploded view showing the removable section of the drive sprocket.

As best shown in FIGS. 1 and 2, the sprocket 16 has a section thereof, designated by the numeral 28, removably mounted and normally retained in position in the main sprocket body by a plurality of cap screws 30. As shown in FIG. 2, when the section 28, which furnishes two teeth for the sprocket, is removed, it leaves an opening 32, the purpose of which will presently appear.

Figure 3:
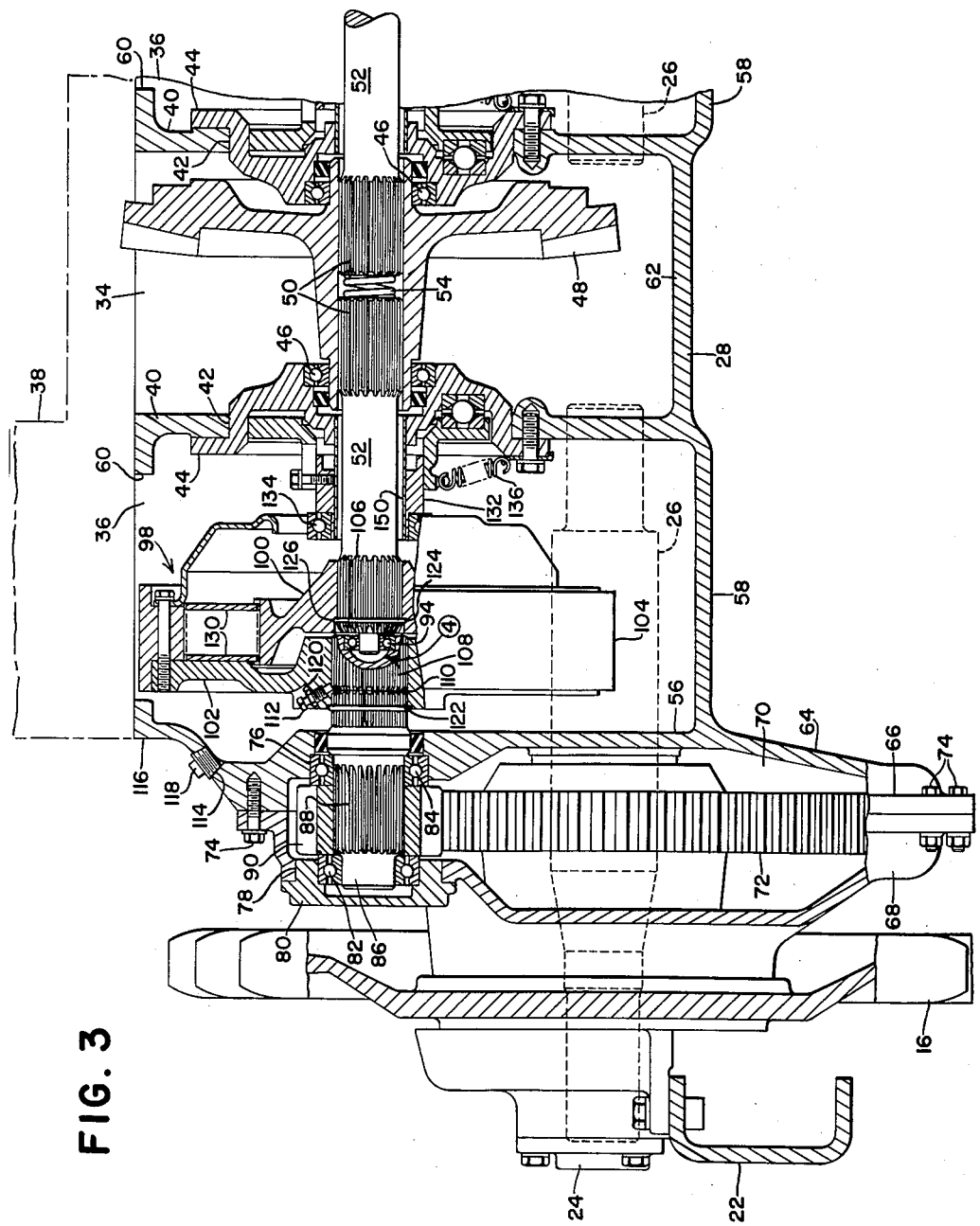
FIG. 3 is a transverse fragmentary section, drawn to an enlarged scale, as seen substantially along the line 3—3 of FIG. 1.

As best shown in FIG. 3, the rear housing means 28 is provided with a central compartment 34 and a pair of flanking compartments 36, one of which is shown only fragmentarily, since it may be regarded as symmetrical as respects the compartment shown in full. Overlying or cover structure 38 normally closes the compartments 34 and 36 so as to enclose the drive components mounted in the respective compartments. Although these compartments are shown as being open at their respective tops, they may open in any other direction radial to the axis of transverse shafting that extends through the compartments. Hence, here, as well as in the claims, such expressions as "top," "front," "rear," etc. should be regarded as terms of description rather than of limitation.

The central compartment is formed by a pair of fore- and aft upright walls 40, each of which is apertured at 42 to receive a bearing carrier 44, and each carrier mounts an anti-friction bearing 46 by means of which the hub of a bevel drive gear 48 is journaled. The hub of the bevel gear is internally splined to axially receive, from opposite sides thereof, the externally splined inner ends 50 of a pair of coaxial inner shafts 52. The inner ends of these shafts are spaced axially apart to receive biasing means in the form of a coiled compression spring 54, the purpose of which will appear presently. Since, as already stated, the structure is symmetrical at opposite sides, only the side shown fully will be described.

The housing means 28 includes a fore-and-aft outer upright wall 56 which, together with the wall 40 already described and a bottom wall 58, forms the compartment 36, which is open at its top as via a top opening 60. The bottom wall 58 may be regarded as part of a continuous bottom wall structure which forms of course a bottom wall 62 for the central compartment 34. As already described, the cover structure 38 is typical of means for closing the top openings for the compartment and it is immaterial whether this cover structure is a single cover for all top openings or is made up of a plurality of covers associated individually with the compartments.

The side wall 56 has an integral depending extension 64 which is flanged at 66 to receive a complementary outer housing element 68, the two portions providing a compartment 70 external to the associated compartment 36. This compartment contains a large drive gear 72 which is coaxially connected in any suitable manner with the associated drive sprocket 16. The two housing parts represented by the elements 64 and 68 are removably bolted together as by bolts and/or cap screws 74 and the walls of these elements respectively have their upper ends provided with coaxial openings at 76 and 78. These openings are coaxial with the shafts 52 previously described.

The opening 78 removably mounts a combined cap and bearing carrier 80 which in turn mounts an anti-friction bearing 82. An anti-friction bearing 84, of larger diameter than the bearing 82, is carried by the opening 76 in the upper portion of the side wall 56. These bearings are spaced axially apart and carry an outer shaft 86, a portion of which intermediate the bearings 82 and 84 is splined at 88 to carry a drive pinion 90 which is in constant mesh with the drive gear 72 in the compartment 70. The inner end of the shaft 86, as at 92, is axially recessed and carries an anti-friction bearing 94 in which is journaled the reduced outer end 96 of the previously described shaft 52. Thus, the two shafts 52 and 86 are disposed in end-to-end relationship and are relatively rotatable, being selectively connectible and disconnectible by a drive unit, designated in its entirety by the numeral 98 and here represented by a steering clutch having a driving part 100 and a driven part 102. As is typical of drive units of this character, the outer part of the driven element 102 may be in the form of a brake drum 104 with which a brake band, not shown, is associated. Controls for the clutch and brake may be suitably carried in the cover structure 38, for example. However, these details are not material here and therefore are not shown, and only brief reference is made thereto for the purposes of orientation.

The hub of the clutch driving part 100 is internally splined to axially receive the splined outer end 106 of the inner shaft 52 at that side of the vehicle. The hub of the driven part 102 is also internally splined to receive the externally splined inner end 108 of the outer shaft 86. The splines 108 on the shaft 86 are interrupted by an annular groove 110 which is engageable by the inner end of a set screw 112 threaded into the hub of the driven part 102 at such angle that it is axially alined with an opening 114 in an upper side wall portion 116 of the housing means 28 at the outer side thereof. This opening is normally closed by a threaded plug 118. When this plug is removed, a suitable tool may be inserted through the opening 114 for backing off the set screw 112 so as to release it from the annular groove 110. The set screw may further carry a lock nut 120 for obvious purposes. When the set screw and jam nut 120 are tightened, the driven clutch part 102 is tightly secured to the splined end 108 of the shaft 86. A snap ring 122, outwardly of the driven part hub may be used to augment the connection between the shaft 86 and the driven part 102.

Figure 4:
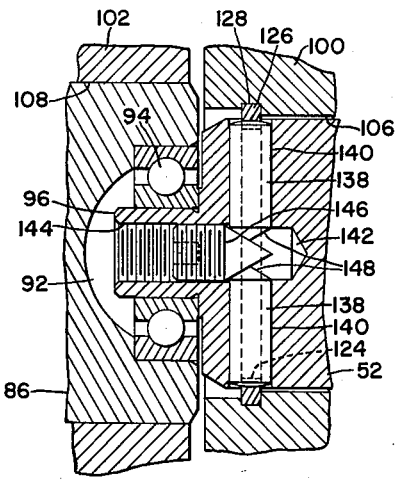
FIG. 4 is an enlarged fragmentary section of that portion of the structure designated by the arrow bearing the encircled numeral 4 in FIG. 3.

As best shown in FIGS. 3 and 4, the outer end of the shaft 52, which is splined at 106, is formed with an annular groove 124 which receives a snap ring 126. When the drive components are assembled, the snap ring 126 is received in a registering internal groove 128 in the hub of the clutch driving part 100. In this condition, then, the shaft 52 and driving part 100 are connected together against axial displacement. Of course, since they are connected by the splines 106, they rotate together. As previously stated, the shafts 52 and 86 are at times relatively rotatable. When the clutch is engaged, as by a plurality of clutch plates 130, the two shafts will of course rotate together. For the purpose of actuating the clutch for engagement and disengagement, any suitable actuator may be utilized, that shown in FIG. 3 and designated generally by the numeral 132 being of the angularly displaceable cam-actuated type which, on angular movement in one direction, also shifts axially to move a throw-out bearing 134 against suitable levers (not shown) for disengaging the clutch. Return springs 136 reverse the angular movement of the actuator when actuating pressure is removed, in which case the usual clutch springs (not shown) cause the clutch to reengage. Here again the details are not material, since they may be varied without limiting the invention.

To return to the disengageable connection between the shaft 52 and the clutch driving part 100: the depth of the snap ring groove 124 in the inner splined end 106 of the shaft 52 is greater than the radial dimension of the snap ring section, and the snap ring is biased to contract so that it will relatively tightly encircle this groove, at least to the extent that it will clear its outer periphery from the groove 128 in the clutch part 100. In that event, the shaft 52 and clutch part may have relative axial movement. However, for the purpose of retaining the snap ring in an expanded state so as to effectuate the connection against axial displacement, means is provided in the form of a plurality of radial plungers 138 which are carried respectively in a plurality of radial bores 140 in the outer end of the inner shaft 52. The bores 140 intersect an axial bore 142 which opens at the reduced end 96 of the shaft. The bore 142 is internally threaded at 144 and receives actuating means in the form of a pointed set screw 146, the pointed end of which cooperates cam fashion at 148 with the inner ends of the plungers 138. Thus, when the set screw is turned inwardly or to the right as seen in FIG. 4, it will propel the plungers 138 outwardly. The outer ends of the plungers engage the inner surface of the snap ring 126 and thus force the snap ring outwardly into the groove 128 of the clutch part 100. The dimensional characteristics are such that the snap ring also retains partial engagement with the groove 124 in the shaft 52. Thus, the snap ring is expanded to a condition in which it establishes the connection between the shaft 52 and clutch part so as to hold the two against relative axial displacement. The set screw 146 may be provided at its outer end with any suitable recess or pocket for the purpose of receiving an acceptable tool. When the set screw is rotated in the opposite direction, the radial outward pressure on the plungers 138 is of course relaxed and the inherent bias in the snap ring 126 will cause the plungers to move radially inwardly as the ring contracts.

As part of the actuator structure 132, the previously described bearing carrier 44 mounts a tube 150 coaxially with and surrounding the shaft 52 between its splined portions 50 and 106. This tube carries the hub of the actuator which in turn carries the thrown-out bearing 134. This much of the structure is described somewhat in detail to establish the fact that, as will presently appear, it need not be disturbed when the clutch 98 is removed bodily from the compartment 36 via the top opening 60 after the covering structure 38 is removed.

The end cap or carrier 80, previously described, is normally retained in place by any suitable removable fasteners, such as cap screws 152 (FIG. 1).

When the mechanism is in normal operating condition, the compartments 34 and 36 are closed by the typical cover 38. The snap ring 126 is expanded to establish the connection between the shaft 52 and the clutch driving part 100. The set screw 112 is tightened into the groove 110 to establish the connection between the shaft 86 and the clutch driven part 102. The bearings are all in place and the end cap 80 is rigidly secured in place. The removable sprocket section 28 is securely bolted in normal operating position.

When it is desired to remove the driving unit, as represented by the steering clutch 98, the cover structure 38 is removed. If the structure at 38 is of separable parts, only that portion covering the top opening 60 of the compartment 36 is removed. With the opening 60 exposed, a suitable sling or other means for supporting the clutch 98 against radial displacement is utilized to remove radial forces from the shafts 86 and 52. The end cap 80 is removed, followed by removal of the plug 118 so that access may be had through the opening 114 to the set screw 112. This is loosened so as to free its inner end from the shaft groove 110 and the shaft 86, together with the bearings 82 and 84 and the pinion 90 is removed through the opening 78, the sprocket section 28 having been previously removed after alinement of the notch 32 with the opening 78. It will be noted that the opening 78 is slightly larger than the outside diameter of the pinion 90, which facilitates removal of the shaft and pinion and bearing assembly as just described. The snap ring 122 need not be removed, since it is outwardly of the clutch 98 and will not interfere with axial shifting of the shaft 86 outwardly through the opening 78. Suitable seals are provided in the assembly but reference thereto has not been made because these are conventional and the relationship thereof to the shafts, bearings etc. is also conventional.

With the shaft 86 and pinion 90 removed, the outer end 96 of the shaft 52 is axially exposed and a suitable tool may be inserted through the access opening thus afforded to turn the set screw 146 outwardly to enable the snap ring 126 to contract, thus clearing the groove 128 in the clutch driving part 100. Since the other shaft 52 is not disturbed, it will serve as a reaction member against which the compression spring 54 reacts so that the spring may push outwardly on the shaft 52 which is being removed. If necessary, a tool may be threaded into the bore 114 to enable the exertion of an axial outward force to free the splines 106 from the hub of the clutch driving part 100 as well as to free the splines 50 from the hub of the bevel gear 48. The splined portion 50 is identical to the splined portion 106 so that as the shaft is axially withdrawn the splines 50 will pass through the hub of the clutch driving part 100.

Once the two shafts 86 and 52 have been removed, the clutch 98 is free for removal upwardly through the top opening 60, which is accomplished, in this case, simply by shifting the clutch to the left, as seen in FIG. 1, so that its right hand portion will clear the throw-out bearing 134 and tube 150.

Reinstallation of the clutch, or a replacement clutch, is accomplished by following the procedure that is just the reverse of that previously described. That is to say, the clutch is inserted through the opening 60 until it is properly axially alined, and the shaft 52 is inserted inwardly through the opening 78, through the opening 76 and through the splined openings afforded in the hubs of the respective clutch parts. At this point, it will be noted that the splined opening in the outer or driven clutch part is larger than that in the inner or driving clutch part. The shaft 52 is pushed inwardly until its inner splined end 50 is received in the bevel gear 48, the spring 54 of course remaining in place. The outer end 106 is received by the hub of the driving part 100, and a tool is inserted through the opening 78 and associated openings so that the set screw 146 may be turned inwardly to propel the plungers outwardly for the purpose of expanding the snap ring 126 into its registering groove 128 in the clutch part 100. As previously stated, the snap ring 126 also retains its engagement with the groove 124 in the outer end of the inner shaft 52. This establishes the non-axial-displaceable connection between the shaft 52 and the clutch part 100.

The shaft 86, together with its bearings and pinion 90, is then inserted inwardly so that it occupies the status of FIG. 3, after which the set screw 112 is tightened, the plug 118 is replaced, and the cap 80 is replaced and secured by the cap screws 152. The sprocket section 28 is restored to the notch 32 in the sprocket and is bolted in place.

It will be seen from the foregoing description that removal of the clutch 98 for servicing or replacement is relatively simple. Of course, the same procedure may be carried out at the opposite side of the vehicle by following a procedure that duplicates that just described. No special tools are required beyond those ordinarily used in the servicing of tractors of this character. The disconnectible securing means between the respective shafts and clutch parts are simple in design and construction and thus are capable of withstanding severe use.

Features other than those outlined herein will readily occur to those versed in the art, as will many modifications and alterations in the preferred embodiment of the invention disclosed, all of which may be achieved without departure from the spirit and scope of the invention.

What is claimed is:

1. In combination: housing means including a box-like portion having transversely spaced apart upright parallel inner and outer walls providing a compartment having an open top, said walls respectively having openings therein coaxial on a transverse axis below the level of said top; a drive unit normally contained in the compartment and of such dimensions as to be passable through said open top, said unit having inner and outer coaxially apertured hubs proximate respectively to the inner and outer walls and normally secured together in assembled relation while in said compartment; inner and outer shafts disposed in coaxial end-to-end relation and received respectively by the inner and outer hubs and extending oppositely respectively into the inner and outer wall openings, said shafts, hubs and outer wall opening being so dimensioned that the outer shaft is capable of axially outward withdrawal from the outer hub via the outer wall opening and the inner shaft is capable of subsequent axially outward withdrawal from the inner hub via the outer hub and outer wall opening; inner releasable means normally securing the inner hub and inner shaft together; outer releasable means normally securing the outer shaft and outer hub together and located outwardly of the hub-received end of said outer shaft and surrounded by said outer hub and including a releasing element exteriorly of the drive unit and proximate to the outer wall for effecting release of said outer releasable means while the hubs remain in their aforesaid assembled relationship; and actuating means at the hub-received end of the inner shaft and connected to the inner releasable means, said actuating means being so located and dimentioned as to be axially accessible through the outer hub upon withdrawal of the outer shaft and operative to release said inner releasable means while the hubs remain in said assembled relationship so as to enable subsequent axially outward withdrawal of the inner shaft whereby to enable upward removal of the assembled drive unit from the compartment via said open top.

2. The invention defined in claim 1, including: a reaction part associated with the housing means; and biasing means acting on the inner shaft and reacting on said part to bias the inner shaft in an axially outward direction.

3. The invention defined in claim 1, in which: the said outer wall has an access opening therein in addition to said first mentioned opening and via which said element is accessible to operate said outer releasable means.

4. The invention defined in claim 1, in which: the inner releasable means includes a release device movable selectively in radially opposite directions for connecting and disconnecting the inner hub and inner shaft; and the actuating means engages said device and is axially movable selectively in opposite directions to incur radial movement of said device.

5. The invention defined in claim 4, in which: said release device includes an annular groove in the inner shaft and a normally radially registering internal annular groove in the hub; ring means received in the registering grooves and normally biased for radial contraction into the shaft groove, said ring means and grooves being so dimensioned that the ring means when contracted clears the hub groove; and means operative by axial movement of the actuating means in one direction to expand the ring means for receipt in part by both grooves.

6. The invention defined in claim 4, in which: said release device includes an annular groove in the inner shaft and a normally radially registering internal annular groove in the inner hub; an axial tapped bore in the inner shaft and opening toward the outer shaft; radial bores in the inner shaft and communicating with the shaft groove and with said axial bore; ring means received in the registering grooves and normally biased for radial contraction into the shaft groove, said ring means and grooves being so dimensioned that the ring means when contracted clears the hub groove; plungers slidable respectively in the radial bores and having inner ends exposed at said axial bore and outer ends engaging the ring means; and the actuating means is threadedly received in the axial bore and engages the plungers for axial movement in one direction to cause the plungers to expand the ring means for receipt in part by both grooves and for axial movement in the opposite direction to enable the ring to contract.

7. The invention defined in claim 1, in which: the hub-received end of the inner shaft has a recess therein; the inner releasable means is received in part in said recess and includes a release device movable selectively in opposite radial directions for connecting and disconnecting the inner hub and inner shaft; and the actuating means is received in part in said recess to engage said inner releasable means and is axially movable selectively in opposite directions to incur radial movement of said release device.

8. In combination: housing means including a box-like portion having transversely spaced apart upright parallel inner and outer walls providing a compartment having an open top, said walls respectively having openings therein coaxial on a transverse axis below the level of said top; a drive unit normally contained in the compartment and of such dimensions as to be passable through said open top, said unit having inner and outer coaxially apertured hubs proximate respectively to the inner and outer walls; inner and outer shafts disposed in coaxial end-to-end relation and received respectively by the inner and outer hubs and extending oppositely respectively into the inner and outer wall openings, said hub-received end of said inner shaft having an outwardly opening recess facing the hub-receiving end of the outer shaft; inner releasable means normally securing the inner hub and inner shaft together; said inner releasable means being contained at least in part in said recess so as to be circumferentially enclosed by the inner hub and axially covered by the hub-received end of the outer shaft; outer releasable means normally securing the outer shaft and outer hub together; and said shafts, hubs and outer wall opening being so dimensioned that the outer shaft is capable of axially outward withdrawal from the outer hub via the outer wall opening when the outer releasable means is released so as to expose the inner releasable means for access exclusively through the outer hub to release the inner shaft for subsequent axially outward withdrawal via the inner and outer hubs and outer wall opening.

9. In combination: a drive unit having inner and outer coaxial parts provided respectively with axial openings therein; an outer shaft having an inner end receivable coaxially by the opening in the outer part; outer releasable means operative selectively to connect and disconnect said outer shaft and outer part to respectively prevent and permit axially outward withdrawal of said shaft from said outer part; an inner shaft having an outer end coaxially receivable in the inner part opening; inner releasable means operative selectively to connect and disconnect said inner shaft and inner part to respectively prevent and permit axial separation thereof and including an annular external groove in the inner shaft, an annular internal groove in the inner part normally in radial register with the shaft groove, and ring means concentrically received in and biased to contract into the shaft groove clear of the part groove to enable axial separation of the inner part and inner shaft, said ring means being radially expansible into the part groove while retaining engagement with the shaft groove so as to connect the inner shaft and inner part; and actuating means exposed at the outer end of the inner shaft when the outer shaft is withdrawn from the outer part and operative on the ring means to selectively incur expansion and contraction of same.

10. In combination: a drive unit having inner and outer coaxial parts provided respectively with axial openings therein; an outer shaft having an inner end receivable coaxially by the opening in the outer part; outer releasable means operative selectively to connect and disconnect said outer shaft and outer part to respectively prevent and permit axially outward withdrawal of said shaft from said outer part; an inner shaft having an outer end coaxially receivable in the inner part opening; inner releasable means operative selectively to connect and disconnect said inner shaft and inner part to respectively prevent and permit axial separation thereof and including a radially outwardly facing recess in the inner shaft, a radially inwardly facing recess in the inner part normally in radial register with the shaft recess, and lock means biased to contract into the shaft recess clear of the inner part recess to enable axial separation of the inner part and inner shaft, said lock means being radially expansible into the part recess while retaining engagement with the shaft recess so as to connect the inner shaft and inner part; and actuating means exposed at the outer end of the inner shaft when the outer shaft is withdrawn from the outer part and operative on the lock means to selectively incur expansion and contraction of same.

11. In combination: support means having inner and outer transversely spaced apart support elements respectively having openings coaxial on a transverse axis; a shaft-receiving unit disposed between the support elements and having a through opening therein coaxial with the support element openings; inner and outer coaxial shafts disposed in end-to-end relation, with each shaft having one end received in said through opening and surrounded by the unit and its opposite end extending into the opening of the proximate support element; annular bearing means surrounded by the unit and coaxially supporting one shaft on the other at said surrounded ends of said shafts; outer releasable means normally securing the outer shaft against axial withdrawal from the unit outwardly through the opening in the first support element; said surrounded end of the inner shaft having an axial recess therein opening toward the outer shaft through the bearing means; inner releasable means within said recess and axially inwardly of the bearing means and normally releasably securing the inner shaft to the unit, said inner releasable means being normally blocked by the outer shaft but axially accessible when said outer shaft is removed from the unit; and said through opening, shafts and outer support element opening being so dimensioned and constructed that the inner shaft, when the inner releasable means is released, is capacitated for axial outward removal via the through opening and outer support element opening following release of the outer means and withdrawal of the outer shaft.

12. The invention defined in claim 11, in which: the inner releasable means includes an axially movable actuating element at its surrounded end and accessible as aforesaid when the outer shaft is axially withdrawn.

13. The invention defined in claim 11, in which: the first releasable means is cooperative between the first shaft and the drive unit and includes a generally radially movable actuating element proximate to the first support element, and said first support element has a further opening therein providing for access to said actuating element.

14. In combination: support means having inner and outer transversely spaced apart support elements respectively having openings coaxial on a transverse axis; a shaft-receiving unit disposed between the support elements and having a through opening therein coaxial with the support element openings; inner and outer coaxial shafts disposed in end-to-end relation, with each shaft having one end received in said through opening and surrounded by the unit and its opposite end extending into the opening of the proximate support element; annular bearing means surrounded by the unit and coaxially supporting one shaft on the other at said surrounded ends of said shafts; outer releasable means normally securing the outer shaft against axial withdrawal from the unit outwardly through the opening in the first support element; and said surrounded end of the inner shaft having an axial recess therein opening toward the outer shaft through the bearing means; inner releasable means within said recess and axially inwardly of the bearing means and normally releasably securing the inner shaft to the unit, said inner releasable means being normally blocked by the outer shaft but axially accessible when said outer shaft is removed from the unit.

References Cited in the file of this patent

UNITED STATES PATENTS

| | | | |
|---|---|---|---|
| 283,380 | Cooper | Aug. 21, | 1883 |
| 1,337,205 | Dingman | Apr. 20, | 1920 |
| 1,403,407 | Nelson et al. | Jan. 10, | 1922 |
| 1,464,386 | Ingram | Aug. 7, | 1923 |
| 1,968,419 | Norelius | July 31, | 1934 |
| 2,192,146 | Nightenhelser et al. | Feb. 27, | 1940 |
| 2,549,715 | Siong-Kan | Apr. 17, | 1951 |
| 2,625,343 | Foote | Jan. 13, | 1953 |
| 2,629,616 | McVey | Feb. 24, | 1953 |
| 2,632,543 | Wilson | Mar. 24, | 1953 |
| 2,802,539 | Westfall | Aug. 13, | 1957 |
| 2,869,910 | Fisher et al. | Jan. 20, | 1959 |
| 2,886,357 | Hawk | May 12, | 1959 |

FOREIGN PATENTS

| | | | |
|---|---|---|---|
| 1,158,608 | France | June 17, | 1958 |